(12) United States Patent
Park et al.

(10) Patent No.: US 8,164,012 B2
(45) Date of Patent: Apr. 24, 2012

(54) ONE-TOUCH STOP-LAMP SWITCH OF VEHICLE

(75) Inventors: Joonyoung Park, Seongnam-si (KR); Eansoo Cho, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 310 days.

(21) Appl. No.: 12/619,524

(22) Filed: Nov. 16, 2009

(65) Prior Publication Data

US 2011/0048906 A1 Mar. 3, 2011

(30) Foreign Application Priority Data

Sep. 1, 2009 (KR) .................. 10-2009-0081874

(51) Int. Cl.
*H01H 9/00* (2006.01)
(52) U.S. Cl. .................. 200/61.89; 200/86.5; 200/293
(58) Field of Classification Search .................. 200/47, 200/61.29, 61.41–61.44, 61.58 R, 61.89, 200/86.5, 293, 318, 327; 340/426.32, 468, 340/479; 307/10.8

See application file for complete search history.

(56) References Cited

U.S. PATENT DOCUMENTS

| | | | | | |
|---|---|---|---|---|---|
| 4,170,723 | A | * | 10/1979 | Arsoy | 200/61.89 |
| 4,227,060 | A | * | 10/1980 | Ayres et al. | 200/296 |
| 5,066,838 | A | * | 11/1991 | Smith et al. | 200/61.89 |
| 5,237,138 | A | * | 8/1993 | Blair | 200/293 |
| 5,534,672 | A | * | 7/1996 | Meagher | 200/61.89 |
| 5,853,084 | A | * | 12/1998 | Carter et al. | 200/345 |
| 6,653,582 | B2 | * | 11/2003 | Kasakawa et al. | 200/86.5 |
| 7,807,936 | B2 | * | 10/2010 | Kim et al. | 200/61.89 |
| 7,928,332 | B2 | * | 4/2011 | Kim et al. | 200/61.89 |

FOREIGN PATENT DOCUMENTS

| | | |
|---|---|---|
| JP | 2005-116446 A | 4/2005 |
| KR | 1997-0004738 B1 | 4/1997 |
| KR | 10-0729338 B1 | 6/2007 |
| KR | 10-2008-0026779 A | 3/2008 |
| KR | 10-0811694 B1 | 3/2008 |

* cited by examiner

*Primary Examiner* — Michael Friedhofer
(74) *Attorney, Agent, or Firm* — Morgan, Lewis & Bockius LLP

(57) ABSTRACT

A one-touch stop-lamp switch of a vehicle can contribute to reducing manufacturing costs of a vehicle and ensuring stable and durable quality by quickly and simply mounting the stop-lamp switch at an appropriate position with respect to a brake pedal and stably maintaining the position.

8 Claims, 6 Drawing Sheets

ONE-TOUCH STOP-LAMP SWITCH OF VEHICLE

CROSS-REFERENCE TO RELATED APPLICATION

The present application claims priority of Korean Patent Application Number 10-2009-0081874 filed Sep. 1, 2009, the entire contents of which application is incorporated herein for all purposes by this reference.

BACKGROUND OF THE INVENTION

1. Field of the Invention

The present invention relates to a stop-lamp switch that turns on/off stop lamps after sensing whether the brake pedal of a vehicle is pressed down, in detail, a technology that makes it possible to simply and stably mount a stop-lamp switch on a mounting bracket.

2. Description of Related Art

It is necessary for safe driving, such as ensuring a safety distance from the following vehicles, to indicate whether the brake pedal of a vehicle is operated, by turning on/off the stop lamps at the rear of the vehicle.

A mechanism for detecting whether a brake pedal is operated is mounted on a mounting bracket around a brake pedal in the related art. In the above mechanism, it is very important to mount the stop lamp at a relatively appropriate position with respect to the brake pedal, in order for the stop lamp to generate appropriate electric signals in accordance with the operation of the brake pedal.

The appropriate mounting position of the stop-lamp switch should be set such that the switch knob that elastically protrudes from the stop-lamp switch and the amount of protrusion changes in accordance with the movement of the brake pedal is pressed inside a cover forming the outer shape of the stop-lamp switch when the brake pedal is not pressed down, and the cover forms a gap within a few millimeters from the brake pedal to keep the switch knob sufficiently pressed inside the cover, without directly contacting with the brake pedal.

In assemblage of the vehicle, it is also very important to allow for quick and simple mounting, on the assumption that the stop-lamp switch is mounted at an appropriate position, in terms of manufacturing cost of the vehicle, and it is also a very important technical object to stably maintain the position of the stop lamp mounted as described above.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a one-touch stop-lamp switch that can contribute to reducing manufacturing costs of a vehicle and ensuring stable and durable quality by being quickly and simply mounted at an appropriate position with respect to a brake pedal and stably maintained at the position.

An aspect of the prevent invention provides a one-touch stop-lamp switch of a vehicle, which includes a mounting bracket fixed to a predetermined position with respect to a brake pedal that is in a free position, a switch cover forming the outer shape of a stop-lamp switch, a cover locker fixed to the mounting bracket and changing the position of fixing the switch cover in accordance with relative rotational angle to the switch cover, and/or a rotation-restraining locker connected to the cover locker to change relative rotatable position of the switch cover to the cover locker The present invention can contribute to reducing manufacturing cost of a vehicle and ensuring stable and durable quality by quickly and simply mounting a stop-lamp switch at an appropriate position with respect to a brake pedal and stably maintaining the position.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
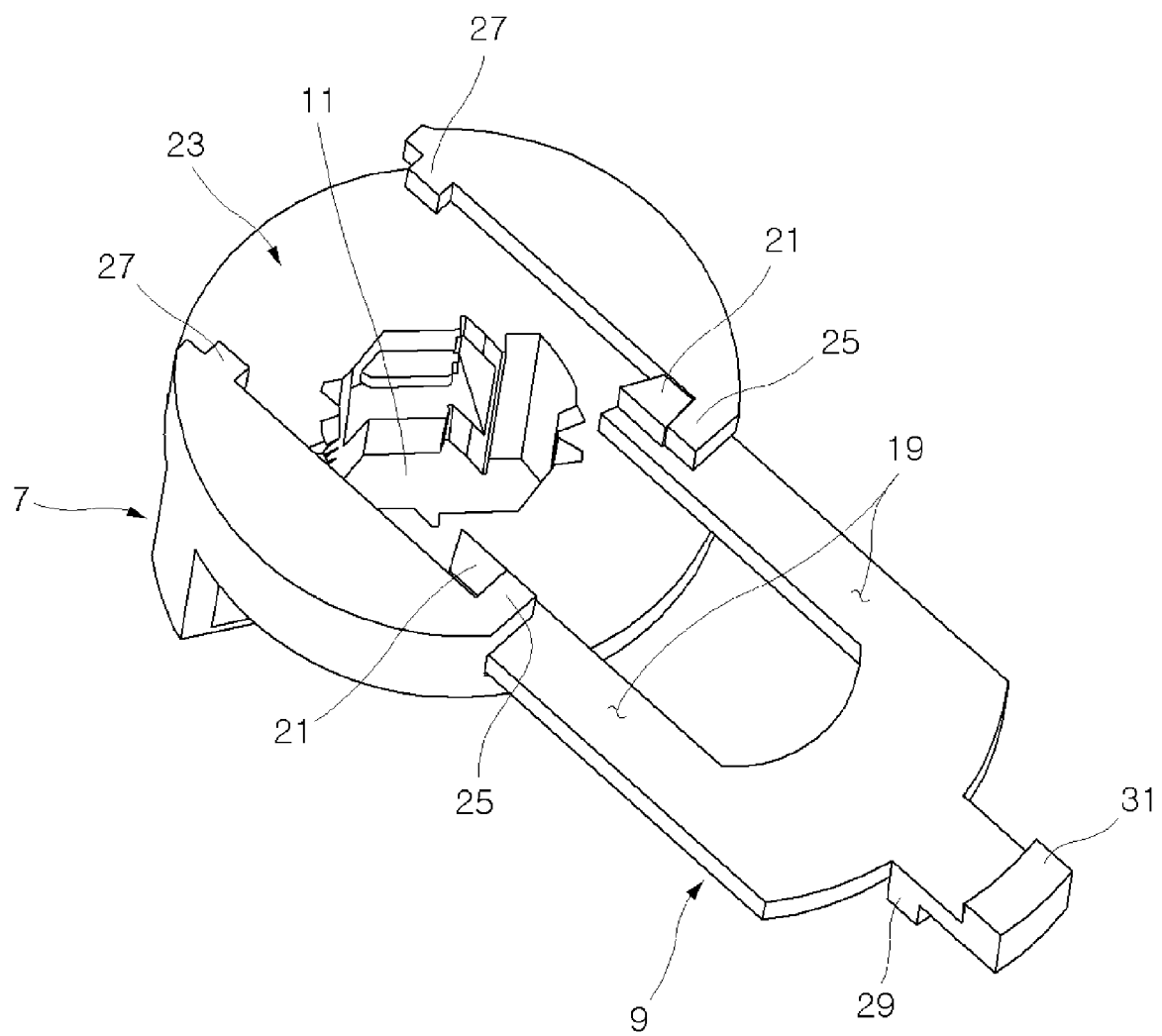
FIG. 1 is a view illustrating a part of the configuration of a one-touch stop-lamp switch of a vehicle according to the present invention.
Figure 2:
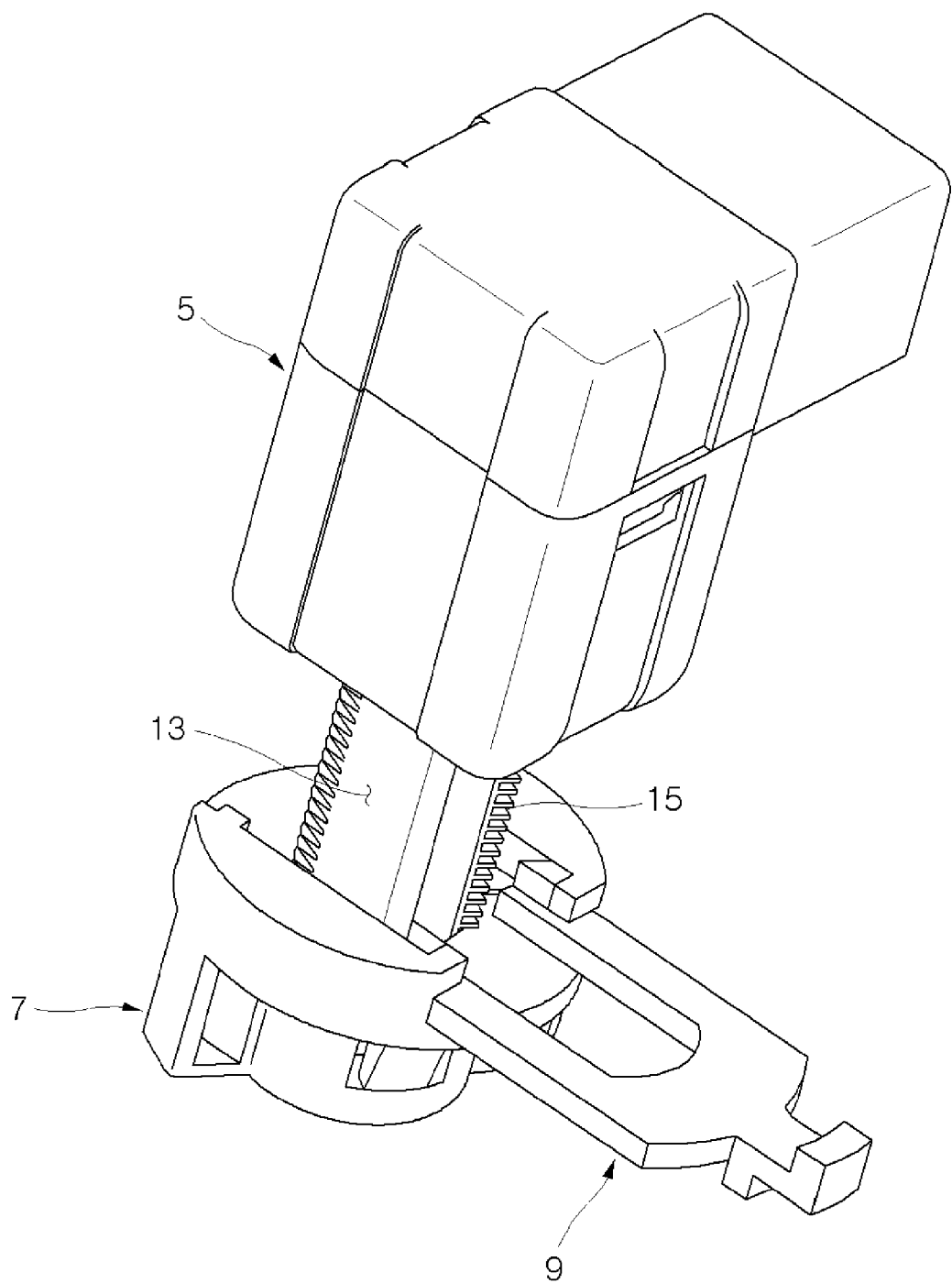
FIG. 2 is a view illustrating when a switch cover is mounted in the configuration of FIG. 1.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Referring to FIGS. 1 to 4, various embodiments of the present invention include a mounting bracket 3 fixed to a predetermined position with respect to a brake pedal 1 that is in a free position, a switch cover 5 forming the outer shape of a stop-lamp switch, a cover locker 7 fixed to mounting bracket 3 and changing the position of fixing switch cover 5 in accordance with relative rotational angle to switch cover 5, and a rotation-restraining locker 9 connected to cover locker 7 to change relative rotatable position of switch cover 5 to cover locker 7.

The free position of brake pedal 1 corresponds with a position when a driver does not press down brake pedal 1 and an electric switch of which electric connection is changed by movement of a switch knob elastically protruding toward brake pedal 1 is disposed in switch cover 5.

Cover locker 7 has a cover-mounting hole 11 that allows a portion of switch cover 5 to move straight therethrough and the portion, which is inserted in cover-mounting hole 11, of switch cover 5 has a uniform cross section in the insertion direction while having a locking surface 13 that is perpendicular to the insertion direction and a male-threaded portion 15 that is engaged in accordance with relative rotation to cover locker 7. Corresponding to this configuration, a female-threaded portion 17 that is engaged with male-threaded portion 15 of switch cover 5 is formed on the inner side of cover-mounting hole 11 of cover locker 7.

That is, the portion of switch cover 5 that is inserted in cover-mounting hole 11 has a circular cross section with a portion cut by locking surface 13, not a complete circular cross section, and accordingly, male-threaded portion 15 are partially formed, as shown in the figures.

Figure 4:
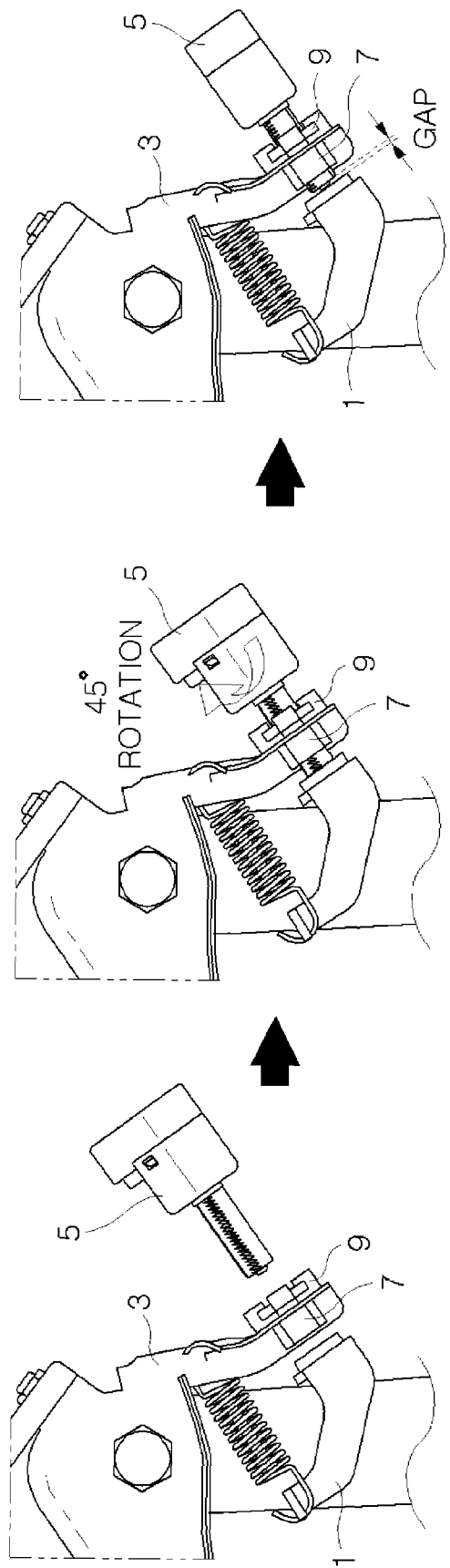
FIG. 4 is a view illustrating a process of assembling the one-touch stop-lamp switch of a vehicle according to the present invention.

Therefore, as shown in FIG. 4, with cover locker 7 fixed to mounting bracket 3, switch cover 5 is inserted into cover-mounting hole 11 such that the end of switch cover 5 contacts with brake pedal 1, and then rotated such that male-threaded portion 15 is engaged with female-threaded portion 17, and as a result, straight movement of switch cover 5 in cover-mounting hole 11 is restrained.

In particular, as described above, with the end of switch cover 5 inserted to contact with brake pedal 1, as male-threaded portion 15 is engaged with female-threaded portion 17 by rotation, a gap within a few millimeters preventing direct contact between the end of switch cover 5 and brake pedal 1 is naturally formed while switch cover 5 retreats a little. Accordingly, it is possible to very quickly and simply fix switch cover 5 of the stop-lamp switch at an appropriate position with respect to brake pedal 1.

The position of switch cover 5 ensured as described above is more stably ensured by rotation-restraining locker 9, which is described in detail below.

In various embodiments, two locking surfaces 13 of switch cover 5 are formed at both sides of switch cover 5 in parallel with each other, and correspondingly, rotation-restraining locker 9 has locking fork portions 19 that are in surface contact with two locking surfaces 13 and combined with cover locker 7 to change the surface contact of locking fork portions 19 with locking surfaces 13 by sliding straight perpendicular to the insertion direction of switch cover 5 into cover locker 7.

Locking fork portions 19 of rotation-restraining locker 9 are formed in a U-shaped flat plate, a guide protrusion 21 protruding from the U-shaped flat plate is formed at the separate ends of the U-shape, a guide slot 23 is formed at cover locker 7 for rotation-restraining locker 9 to slide straight, and release stoppers 25 protrude from both sides of guide slot 23 to restrain straight motion of guide protrusions 21 such that rotation-restraining locker 9 is not separated from cover locker 7.

Snap protrusions 27 are formed at both sides of guide slot 23 to prevent rotation-restraining locker 9 from moving in the separation direction from cover locker 7, when locking fork portions 19 are inserted to be in surface contact with locking surface 13 and guide protrusions 21 are locked after passing by elastic deformation of locking fork portions 19.

An insertion-restraining protrusion 29 that restricts insertion depth of rotation-restraining locker 9 in cover locker 7 by contacting with cover locker 7 is formed at the connecting portion of the U-shaped flat plate of locking fork portions 19.

Further, a grip 31 protrudes in the opposite direction to insertion-restraining protrusion 29 of rotation-restraining locker 9 to provide force for sliding straight rotation-restraining locker 9 with respect to cover locker 7.

Therefore, as described above, with male-threaded portion 15 of switch cover 5 engaged with female-threaded portion 17 of cover-mounting hole 11, when rotation-restraining locker 9 is inserted and locking fork portions 19 are in surface contact with locking surface 13 of switch cover 5, switch cover 5 is prevented from rotating with respect to cover locker 7, such that it is possible to prevent unexpected disengagement of male-threaded portion 15 and female-threaded portion 17 and changes in position of switch cover 5.

Figure 3:
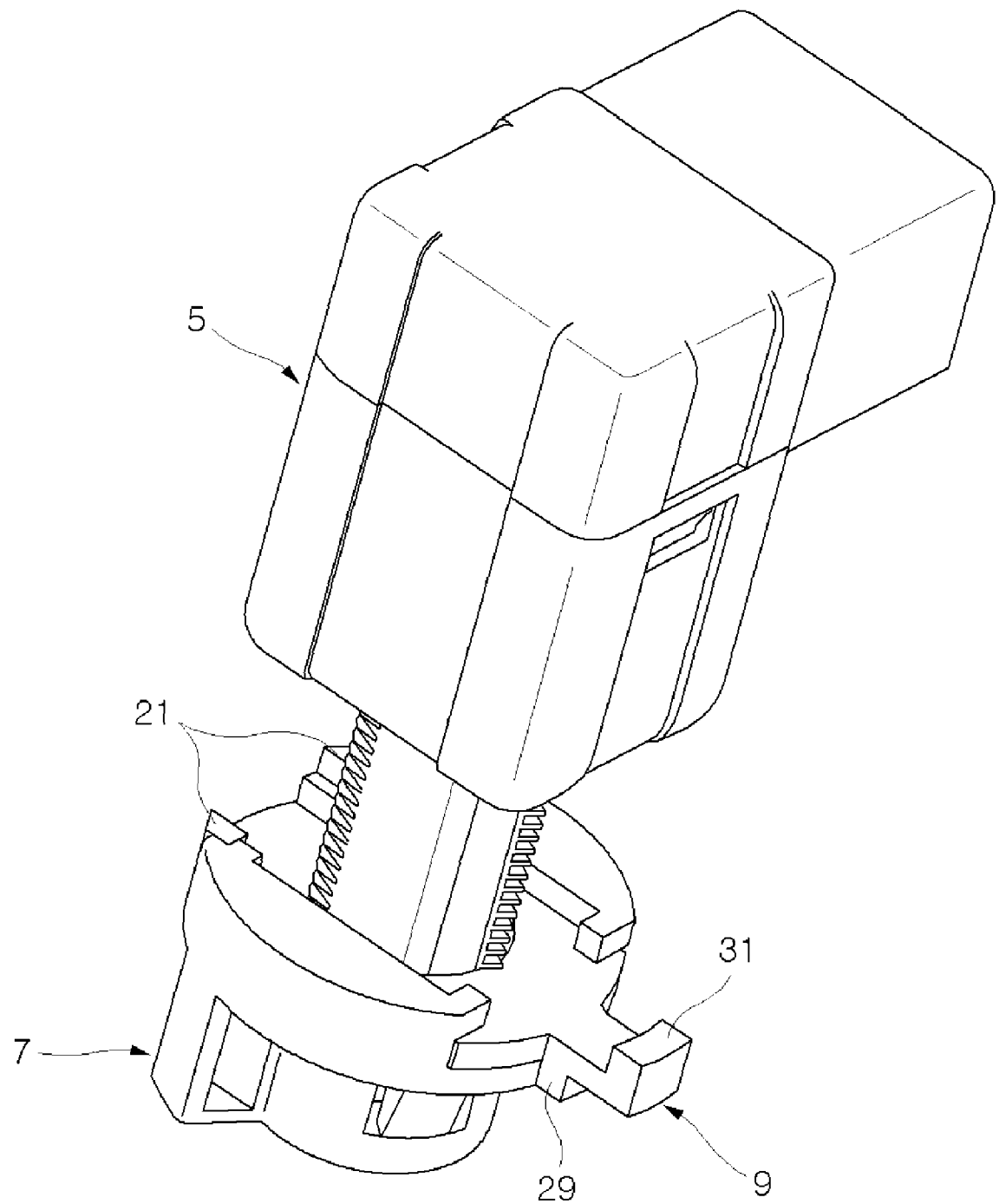
FIG. 3 is a view illustrating when the position of FIG. 2 is stably fixed.

Rotation-restraining locker 9 is assembled in advance with cover locker 7, as shown in FIG. 1 and naturally prevents switch cover 5 from rotating, when switch cover 5 is inserted and fixed by rotation in cover-mounting hole 11, as shown in FIG. 3, and guide protrusions 21 are inserted through snap protrusion 27 to be restricted by insertion-restraining protrusion 29, such that the position of switch cover 5 can be stably maintained.

On the other hand, in maintenance of a vehicle, it is possible to easily separate switch cover 5 by pulling rotation-restraining locker 9 from cover locker 7, holding grip 31 of rotation-restraining locker 9.

In this operation, rotation-restraining locker 9 is pulled until guide protrusions 21 are locked to release stoppers 25 and not completely separated from cover locker 7, such that the position shown in FIG. 1 where it can be assembled again to prevent switch cover 5 from rotating is maintained.

Figure 5:
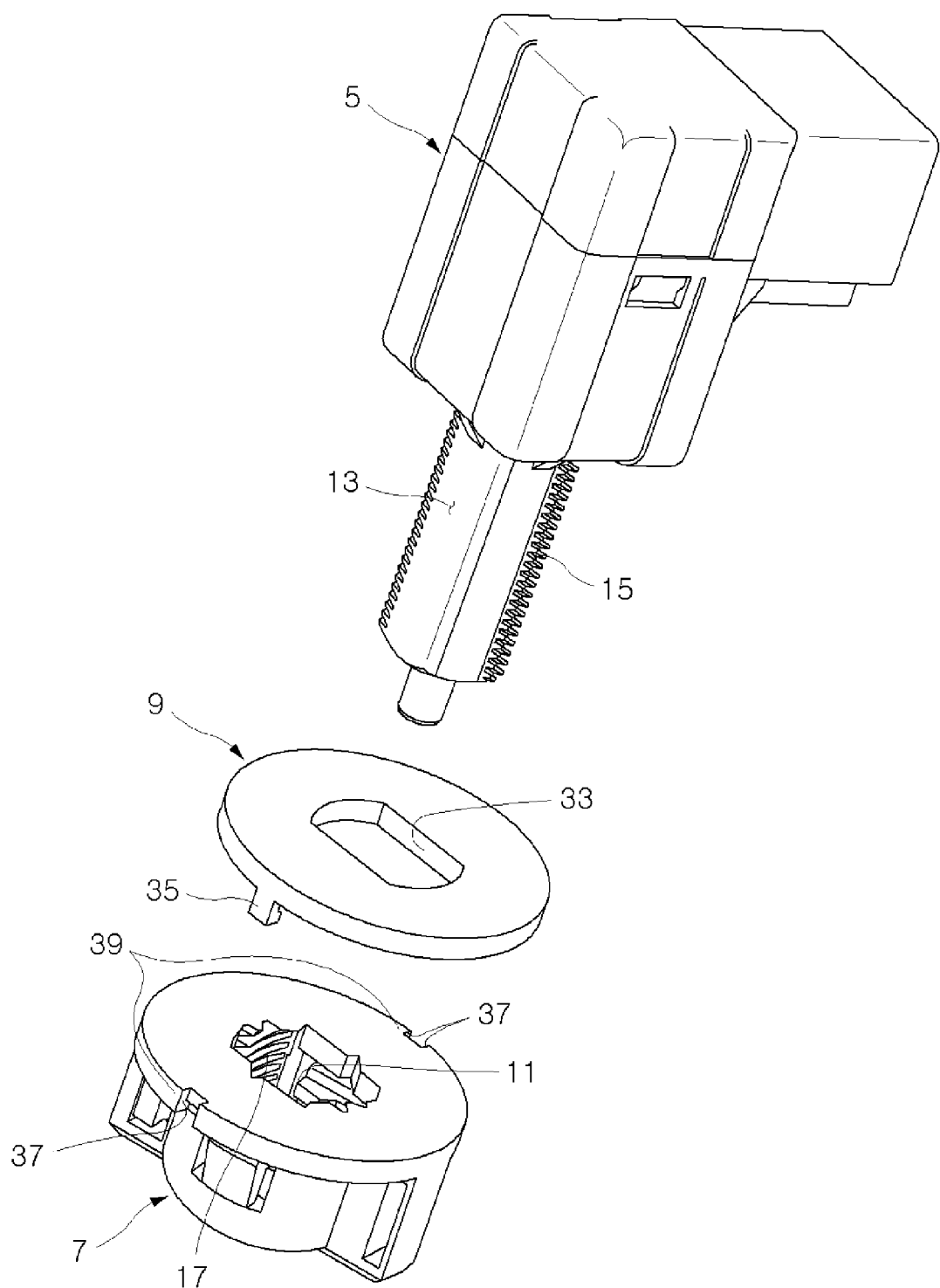
FIG. 5 is a view illustrating another one-touch stop-lamp switch of a vehicle of the present invention.
Figure 6:
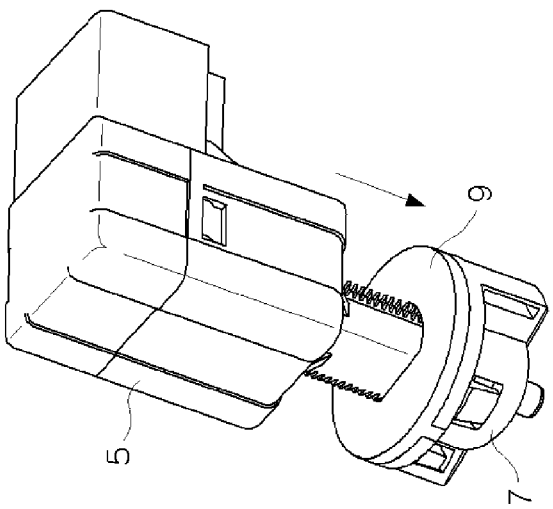
FIG. 6 is a view illustrating a process of assembling the one-touch stop-lamp switch of FIG. 5.
Figure 6:
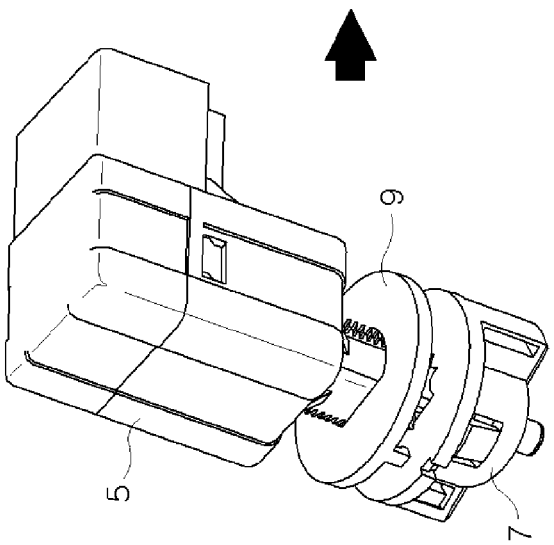
Figure 6:
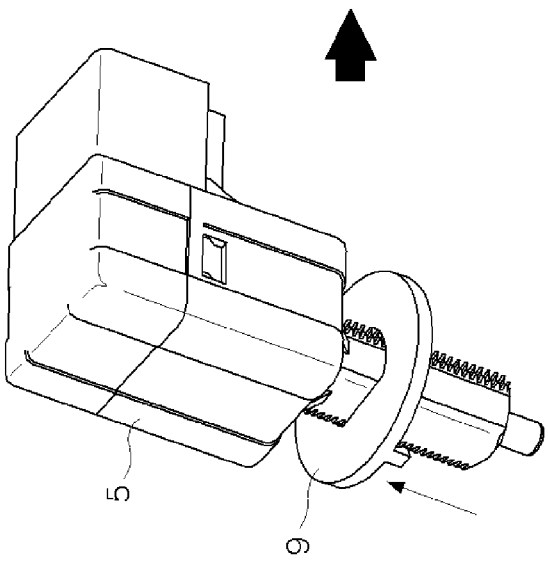

FIGS. 5 and 6 show another embodiment of the present invention, which is different in configuration of rotation-restraining locker 9 from the above embodiment.

That is, rotation-restraining locker 9 has a locking hole 33 where the portion of switch cover 5 inserted in cover-mounting hole 11 is inserted and prevented from relatively rotating, and an anti-rotation means that fixes rotation-restraining locker 9 to cover locker 7 is included to prevent locking hole 33 from rotating with respect to cover locker 7.

In various embodiments, rotation-restraining locker 9 is formed in a flat plate shape with locking hole 33 and the anti-rotation means has an elastic locking hook 35 protruding toward cover locker 7 and a rotation-restricting surface 37 formed such that elastic locking hook 35 is locked to cover locker 7 to be prevented from rotating.

Rotation-restricting surface 37 may be a hole formed through cover locker 7, but in various embodiments it is formed of a locking slot 39 formed on the outer surface of cover locker 7.

In various embodiments described above, as shown in FIG. 6, with rotation-restraining locker 9 inserted in switch cover 5 through locking hole 33, switch cover 5 is inserted and rotated in the locker cover to be fixed at a predetermined distance from brake pedal 1, elastic locking hook 35 of rotation-restraining locker 9 is fitted in locking slot 39 such that anti-rotation surface 37 forming locking slot 39 can prevent rotation of elastic locking hook 35. As a result, switch cover 5 is prevented from rotating with respect to cover locker 7, such that switch cover 5 is stably fixed with respect to cover locker 7.

For convenience in explanation and accurate definition in the appended claims, the terms "rear", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A one-touch stop-lamp switch of a vehicle, the stop-lamp switch comprising:
   a mounting bracket fixed at a predetermined position with respect to a free position of a brake pedal;
   a switch cover forming an outer shape of the stop-lamp switch;
   a cover locker fixed to the mounting bracket and changing the position of fixing the switch cover in accordance with relative rotational angle of the cover locker relative to the switch cover; and
   a rotation-restraining locker connected to the cover locker to change relative rotatable position of the switch cover to the cover locker;
   wherein the cover locker has:
   a cover-mounting hole that allows a portion of the switch cover to move straight therethrough;
   the portion of the switch cover, which is inserted in the cover-mounting hole, has a uniform cross section in the insertion direction while having a locking surface that is perpendicular to the insertion direction, and a male-threaded portion that is engaged in accordance with rotation relative to the cover locker; and
   a female-threaded portion that is engaged with male-threaded portion of the switch cover is formed on the inner side of the cover-mounting hole of cover locker;
   wherein two locking surfaces of the switch cover are formed at both sides of the switch cover in parallel with each other;
   rotation-restraining locker has locking fork portions that are in surface contact with the two locking surfaces and combined with the cover locker to change the surface contact of the locking fork portions with locking surfaces by sliding straight perpendicular to the insertion direction of the switch cover into the cover locker.

2. The one-touch stop-lamp switch of a vehicle as defined in claim 1, wherein the locking fork portions of the rotation-restraining locker are formed in a U-shaped flat plate,
   a guide protrusion protruding from the U-shaped flat plate is formed at the separate ends of the U-shape,
   a guide slot is formed at the cover locker for rotation-restraining locker to slide straight, and
   release stoppers protrude from both sides of the guide slot to restrain straight motion of the guide protrusions such that the rotation-restraining locker is not separated from the cover locker.

3. The one-touch stop-lamp switch of a vehicle as defined in claim 2, wherein snap protrusions are formed at both sides of the guide slot to prevent the rotation-restraining locker from moving in the separation direction from the cover locker, when the locking fork portions are inserted to be in surface contact with the locking surface and the guide protrusions are locked after passing by elastic deformation of the locking fork portions, and
   an insertion-restraining protrusion that restricts insertion depth of the rotation-restraining locker in the cover locker by contacting with the cover locker is formed at the connecting portion of the U-shaped flat plate of the locking fork portions.

4. The one-touch stop-lamp switch of a vehicle as defined in claim 3, wherein a grip protrudes in the opposite direction to the insertion-restraining protrusion of the rotation-restraining locker to provide force for sliding straight the rotation-restraining locker with respect to the cover locker.

5. The one-touch stop-lamp switch of a vehicle as defined in claim 1, wherein the rotation-restraining locker has a locking hole where the portion of the switch cover inserted in the cover-mounting hole is inserted and prevented from relatively rotating, and
   an anti-rotation means that fixes the rotation-restraining locker to the cover locker to prevent the locking hole from rotating with respect to the cover locker.

6. The one-touch stop-lamp switch of a vehicle as defined in claim 5, wherein the rotation-restraining locker is formed in a flat plate shape with a locking hole, and
   the anti-rotation means has an elastic locking hook protruding toward the cover locker and a rotation-restricting surface formed such that an elastic locking hook is locked to the cover locker to be prevented from rotating.

7. The one-touch stop-lamp switch of a vehicle as defined in claim 6, wherein the rotation-restricting surface is formed by a locking slot formed on the outer side of the cover locker.

8. A brake pedal assembly comprising the one-touch stop-lamp switch of a vehicle as defined in claim 6, the brake pedal assembly further including a brake pedal, wherein the mounting bracket is fixed at a predetermined position with respect to the free position of the brake pedal.

* * * * *